United States Patent [19]

DeLaRosa

[11] Patent Number: 5,009,600
[45] Date of Patent: Apr. 23, 1991

[54] METHOD OF PAINTING CLAY BODIES

[75] Inventor: Robert L. DeLaRosa, Livonia, Mich.

[73] Assignee: General Motors Corporation, Detroit, Mich.

[21] Appl. No.: 486,624

[22] Filed: Feb. 28, 1990

[51] Int. Cl.$^5$ .......................... G09B 11/00; B05D 1/36
[52] U.S. Cl. ....................................... 434/82; 427/384;
427/385.5; 427/393.6; 427/407.1; 427/417;
428/542.2; 428/411.1
[58] Field of Search .................. 427/384, 385.5, 393.6,
427/407.1, 417; 428/411.1, 542.2; 434/82

[56] References Cited

U.S. PATENT DOCUMENTS 4,867,922  9/1989  Zuccato ................................. 434/82
4,946,552  8/1990  Onnie ................................... 156/250

OTHER PUBLICATIONS

Nylen et al., *Modern Surface Coatings*, (Interscience, London) c. 1965, pp. 142-145.

Primary Examiner—Norman Morgenstern
Assistant Examiner—Margaret Bueker
Attorney, Agent, or Firm—Randy W. Tung

[57] ABSTRACT

A method of painting a clay body and maintaining a durable, decorative surface finish by providing a barrier film layer between the paint coat layer and the clay body such that the oily substance contained in the clay body is blocked from permeating through the barrier film to adversely affect the paint coat layer.

4 Claims, 1 Drawing Sheet

METHOD OF PAINTING CLAY BODIES

This invention generally relates to a method of painting a clay body with a paint coat layer and, more particularly, relates to a method of painting a clay body and maintaining a durable, decorative surface finish by providing a barrier film layer between the paint coat layer and the clay body such that the oily substance contained in the clay body being blocked from permeating through the barrier film to adversely affect the paint coat layer.

BACKGROUND OF THE INVENTION

In the design of automobiles, the transfer of a new design from a blueprint to a three-dimensional clay model is an important step. Clay models of new automobile designs have been used for many years for the evaluation of design concepts. It enables an automobile designer to view his design in real dimension.

Modeling clays that can be shaped by hand at room temperature have been used in making automobile clay models. The clay material is first heated and then spread and sculptured to the shape of an automobile.

It is desirable at some point in the design process for the designer to evaluate an automobile clay model with a high quality paint coat layer finish so that the designer can properly evaluate the design as it would appear in a production process. I use the term paint coat layer to broadly define a layer of at least one color coat alone, layers of at least one primer coat and at least one color coat, or layers of at least one primer coat, at least one color coat and at least one clear coat. Prior to the onset of the present invention, this would require that the clay body be sent to a molding department where plaster molds would be cast from the clay body and a fiberglass skin then built-up inside the plaster molds.

The fiberglass skin would then be surface finished and sent to a paint department where the fiberglass skin would be painted to the quality level of a production vehicle. The entire process would take two to three weeks and consuming approximately 360 man-hours. Frequently, the clay body is damaged in the plaster casting process and requires extensive and costly repair work.

The present invention provides a method which permits the painting of a clay body directly with a high gloss finish in two to three days or approximately 40 man-hours. Alternatively, a strippable coating may first be applied onto the clay body (as shown in our preferred embodiment), if the designer decides to make changes in the clay body, the paint coat layer can be peeled off of the clay body and the clay modeling process can continue.

In either of these two processes, problems are frequently encountered in maintaining a durable paint coat finish on the clay model. Since the clay material used in shaping clay models normally contains a large amount of oily substances, these oily substances migrate from the body of the clay to the surface of the clay model causing blisters and subsequent separations of the paint coat film from the strippable layer or from the clay surface. The use of the strippable coating layer on the clay surface does not stop the permeation of the oily substances from the clay body to the paint coat layer. It has been observed that the paint coat layer applied directly on the clay body or on the strippable coating layer would not maintain its desirable finish more than approximately one month after it is applied.

It is, therefore, an object of the present invention to provide a method of painting clay bodies by providing a barrier film layer between the paint coat layer and the clay body such that the oily substance contained in the clay body is blocked from permeating through the barrier film to adversely affect the paint coat finish.

It is another object of the present invention to provide a method of painting a clay body on a strippable coating layer and maintaining a durable, decorative surface finish by providing a barrier film layer between the paint coat layer and the strippable coating-clay body such that the oily substance contained in the clay body is blocked from permeating through the barrier film to adversely affect the paint coat finish.

SUMMARY OF THE INVENTION

In accordance with a preferred practice of my invention, a body of clay ready to be decorated is first provided. The body of clay is then coated with a diluted shellac layer, and after drying, a primer coat layer and a color coat layer of a desirable color are sequentially coated on top of the shellac layer.

Alternatively, if the strippable feature of the paint coat layer is desired, a strippable coating of acrylic base is first coated on the body of clay. A diluted shellac layer is then applied on the strippable coating layer and dried. The primer coat layer and the color coat layer of a desirable color are then applied on top of the shellac layer.

In yet another alternate method, one or more layers of clear coat may be applied on top of the color coat layer to achieve a more glossy finish on the clay body.

BRIEF DESCRIPTION OF THE DRAWINGS

This and other objects, features and advantages of the present invention will become apparent upon consideration of this specification and the appended drawings, in which.

DETAILED DESCRIPTION OF THE PREFERRED EMBODIMENT

Figure 1:
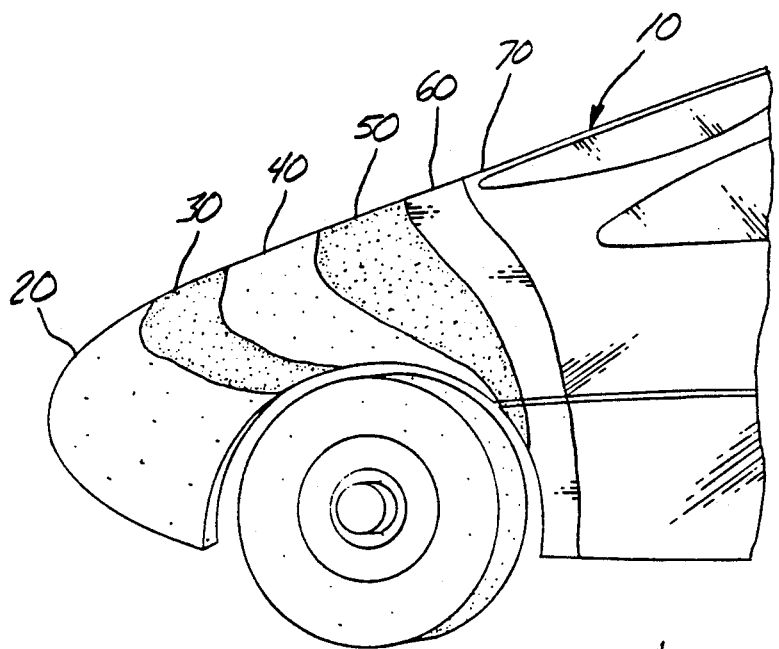
FIG. 1 is a partial perspective view of a vehicle front end showing the separate layers of coatings.
Figure 2:
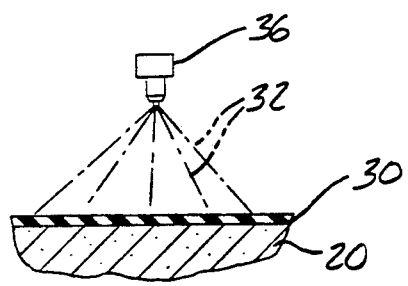
FIG. 2 is a partial cross-sectional view showing a strippable coating layer is being applied on the clay body.

Referring initially to FIG. 1, a partial perspective view of a vehicle front end 10 is shown. The clay body 20 is first coated by a sprayer 36 in which droplets 32 of a strippable coating material is sprayed onto the clay body forming a strippable coating layer 30. This is shown in FIG. 2.

It is to be noted that in my alternate embodiment, the strippable coating layer is not used such that the shellac layer is applied directly to the clay body. The use of a strippable coating layer is recommended when easy removability of the paint coat layer on a clay body is desired.

I have found that a suitable strippable coating material to be used on clay bodies is a water based latex coating. One of such latex coatings can be obtained commerciallty from the Spraylat Corporation, Mount Vernon, New York under the codename of SPRAYLAT ®1071B, also known as Black Peel-Off. This material forms a solid film having sufficient internal cohesive strength that it is capable of being peeled off of the clay body yet it has enough adhesion to the clay to permit subsequent paint layers to be applied on it without loss of adhesion. A sufficient amount of time is allowed for the strippable coating to dry and cure, for instance, overnight drying is normally adequate. This drying process can be accelerated by applying warm air.

Figure 3:
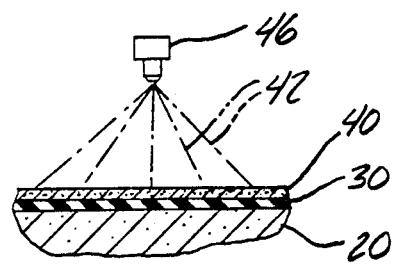
FIG. 3 is a partial cross-sectional view showing a diluted shellac layer is being applied on the clay body over the strippable coating layer.

After the strippable coating layer is sufficiently dried, or in my alternate embodiment where no strippable coating is used, a diluted shellac layer 40 is applied either on top of the strippable coating layer 30 as shown in FIG. 3, or directly on the clay body (not shown) by spraying droplets 42 of diluted shellac from the sprayer 46.

I have tried verious barrier film materials other than shellac on the clay body without success. Great difficulties arise in the selection of barrier film materials in that the barrier film material not only has to act as a barrier layer between the clay body and the subsequently applied paint coat layer, but also must have good adhesion to either the clay body or the strippable coating layer and to the subsequently applied primer coat or color coat layer. I have discovered that the only material which satisfies both of these two critical requirements is the orange shellac material. One of such shellac material that I have found suitable for my novel invention is the orange shellac supplied by William Zinsser & Co., Somerset, New Jersey sold under the tradename of BULLS EYE ® Shellac. Other shellac materials having comparable properties may also be suitably used.

In order to facilitate spraying, I have diluted the orange shellac in denatured ethyl alcohol. A suitable range of dilution is shellac/ethyl alcohol in the range between 30/70 to 50/50 volume ratio. Other types of alcohol may also be suitably used as solvent for the orange shellac.

I have discovered that the shellac layer is critical to the performance of my novel invention because it effectively blocks oil in the clay from bleeding or permeating through and causing blistering and subsequent loss of adhesion of the primers and the color coats applied later. Other types of primer coats and barrier coats I have tried were not successful in that they either caused blistering, cracking, or blisters filled with clay oil to appear on the clay body after it has been finally finished.

Figure 4:
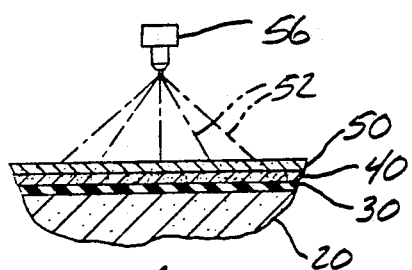
FIG. 4 is a partial cross-sectional view showing a primer coat layer is being applied on the clay body on top of the shellac layer.
Figure 5:
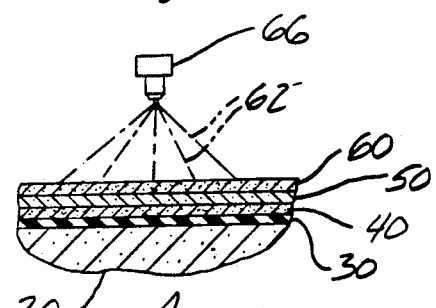
FIG. 5 is a partial cross-sectional view showing a color coat layer is being applied to the clay body on top of the primer coat layer.
Figure 6:
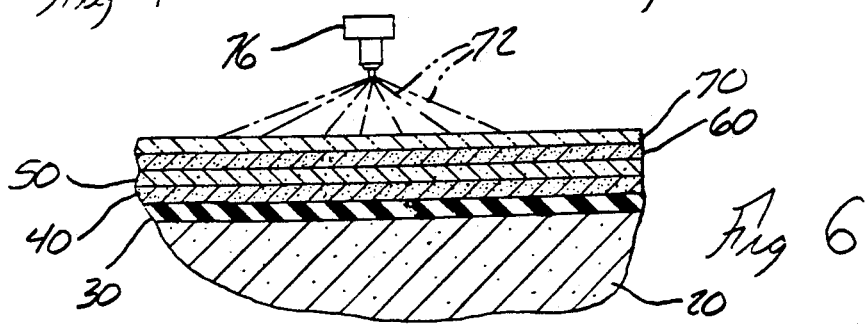
FIG. 6 is a partial cross-sectional view showing a clear coat layer is being applied to the clay body on top of the color coat layer.

FIG. 4 shows the next step of my novel invention where a primer coat material 52 is being sprayed from sprayer 56 onto the clay body 20 over the top of the shellac layer 40 to form a primer coat layer 50. After the primer coat 50 is dried, a color coat layer of a desirable color 60 is applied by spraying drophets 62 of the color coat from sprayer 66 onto the clay body 20 over the cured primer coat layer 50. This is shown in FIG. 5.

In another alternate embodiment of my novel invention, at least one layer of clear coat 70 is applied onto the clay body 20 by spraying droplets 72 of the clear coat material from sprayer 76 to the clay body 20 over the cured and dried layer of the color coat 60. This clear coat layer is applied to further improve the glossiness of the painted finish on the clay body. It is optional, depending upon the gloss level desired. It should also be recognized that in some painting operations on clay bodies, the primer coat layer shown in FIG. 4 may not be necessary so that the color coat layer may be applied directly on the shellac layer.

The embodiment of the invention in which an exclusive property or privilege is claimed are defined as follows:

1. A method of painting a clay body and maintaining a durable decorative surface finish by providing a barrier film layer between the paint coat layer and the clay body such that the oily substance contained in the clay body being blocked from permeating through said barrier film to adversely affect said paint coat layer comprising the steps of:
   providing a body of clay ready to be decorated,
   coating said body of clay with a strippable coating layer,
   coating said body of clay with a diluted shellac layer over said strippable coating layer,
   coating said body of clay with a primer coat layer over said shellac layer, and
   coating said body of clay with a color coat layer of a desirable color over said primer coat layer.

2. In the method of claim 1, further comprising the step of coating said body of clay with a clear coat layer over said color coat layer.

3. In the method of claim 1, diluting said shellac with ethyl alcohol at a volume ratio of shellac/alcohol between 30/70 to 50/50.

4. A clay body painted by the method according to claim 1.

* * * * *